(12) United States Patent
Huang

(10) Patent No.: US 8,248,673 B2
(45) Date of Patent: Aug. 21, 2012

(54) IMAGE READING APPARATUS CAPABLE OF SEPARATING PAGES OF IMAGES

(75) Inventor: Chih-Fang Huang, Pingtung County (TW)

(73) Assignee: Avision Inc. (TW)

( * ) Notice: Subject to any disclaimer, the term of this patent is extended or adjusted under 35 U.S.C. 154(b) by 556 days.

(21) Appl. No.: 12/503,436

(22) Filed: Jul. 15, 2009

(65) Prior Publication Data
US 2010/0046043 A1   Feb. 25, 2010

(30) Foreign Application Priority Data
Aug. 19, 2008   (TW) ................ 97131519 A

(51) Int. Cl.
*H04N 1/04* (2006.01)
(52) U.S. Cl. ...................... 358/474; 358/475

(58) Field of Classification Search ............ 358/474, 358/1.18, 505, 486, 461, 498; 359/202.1; 399/45
See application file for complete search history.

(56) References Cited

U.S. PATENT DOCUMENTS
2006/0072179 A1* 4/2006 Caster et al. ............ 359/202
* cited by examiner

*Primary Examiner* — Charlotte M Baker
*Assistant Examiner* — Rury Grisham

(57) ABSTRACT

In an image reading apparatus capable of separating pages of images, an automatic sheet feeder transports first and second documents along a document passageway and past an opening. A separation reference sheet is disposed in the opening and includes a specific portion. A scanning module scans the first and second documents, transported past the opening, to generate a continuous image. An image processing unit coupled to the scanning module receives the continuous image and processes the continuous image into a first document image corresponding to the first document and a second document image corresponding to the second document according to a specific image including the specific portion.

19 Claims, 5 Drawing Sheets

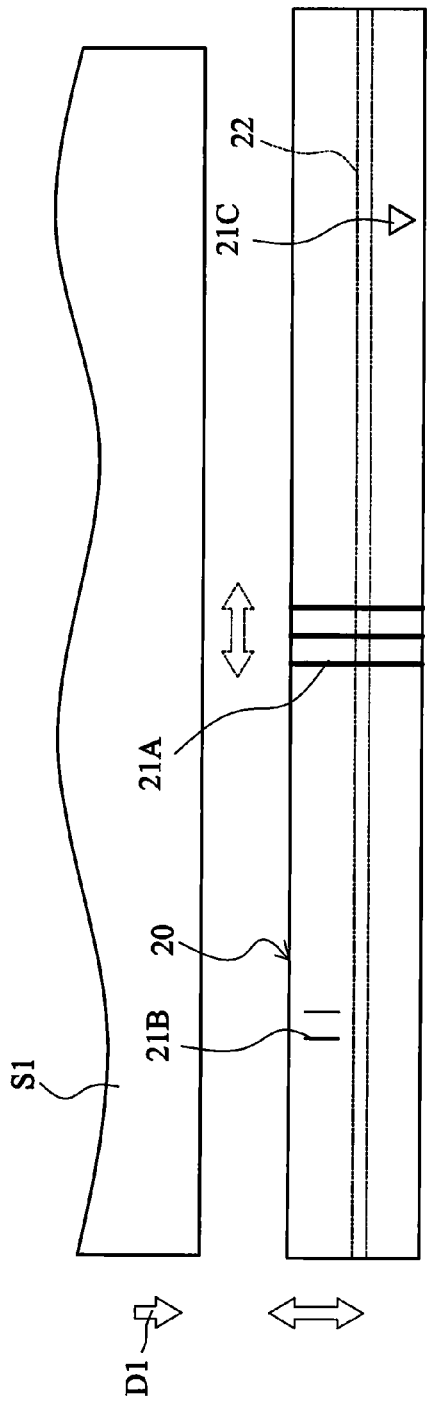
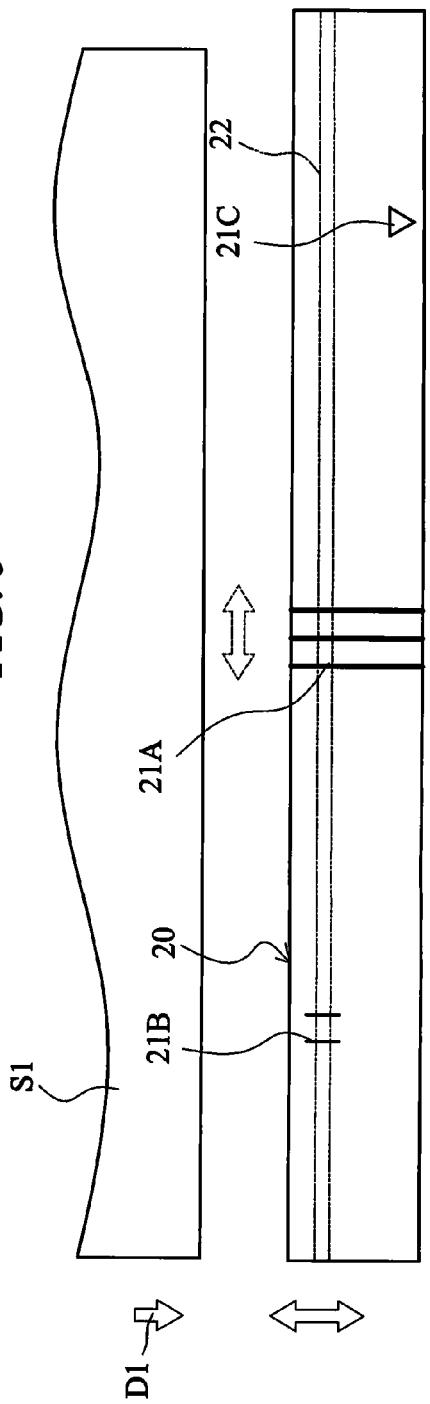

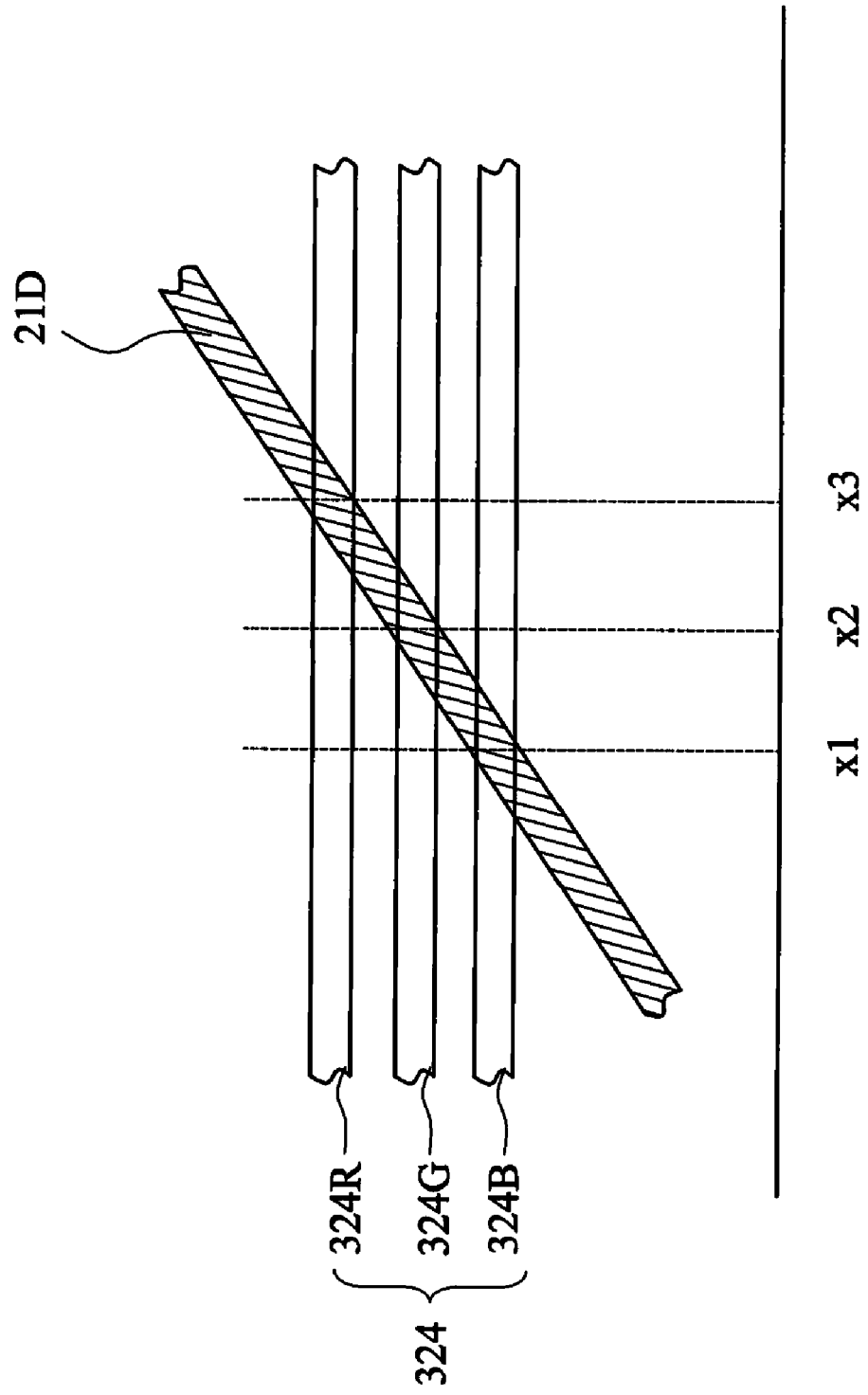

IMAGE READING APPARATUS CAPABLE OF SEPARATING PAGES OF IMAGES

This application claims priority of No. 097131519 filed in Taiwan R.O.C. on Aug. 19, 2008 under 35 USC 119, the entire content of which is hereby incorporated by reference.

BACKGROUND OF THE INVENTION

1. Field of the Invention

The invention relates to an image reading apparatus, and more particularly to an image reading apparatus capable of separating pages of images.

2. Related Art

In a conventional sheet-fed image processing apparatus, a paper sensor has to be provided to determine whether the document is to be or has been transported past a certain specific position in order to provide the function of automatically scanning multiple pages of documents. For example, an electrical, mechanical or optical sensor is disposed on a passageway to sense whether the document is to be transported past the position corresponding to the scan line of the scanning module, or to sense whether the document has been transported past the position corresponding to the scan line of the scanning module. The neighboring two pages of images may be separated according to the sensed information obtained.

However, the provision of the paper sensor usually increases the apparatus cost. The mechanical sensor needs the sufficient long separation gap. If the separation gap is too short, the second document may touch the mechanical sensor before the mechanical sensor senses the separation of the first document from this sensor. Thus, the mechanical sensor cannot judge that the first document has left and the second document has come.

It is therefore a subject of the invention to provide an image reading apparatus capable of separating pages of images with the low cost and without the large separation gap.

SUMMARY OF THE INVENTION

It is therefore an object of the invention to provide an image reading apparatus capable of separating pages of images, wherein the cost is advantageously low and the large separation gap is unnecessary.

To achieve the above-identified object, the invention provides an image reading apparatus capable of separating pages of images. The image reading apparatus includes a housing, an automatic sheet feeder, a separation reference sheet, a scanning module and an image processing unit. The automatic sheet feeder is connected to the housing and includes a document passageway. The document passageway has an opening. The automatic sheet feeder is for transporting a first document and a second document along the document passageway and past the opening. The separation reference sheet disposed in the opening includes a specific portion. The scanning module, disposed in the housing and disposed at a position opposite the separation reference sheet, scans the first document and the second document, transported past the opening, to generate a continuous image. The image processing unit, coupled to the scanning module, receives the continuous image and processes the continuous image into a first document image corresponding to the first document and a second document image corresponding to the second document according to a specific image including the specific portion.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIGS. 4 to 6 are schematic illustrations showing separation reference sheets according to several embodiments of the invention.

FIG. 7 is a schematic illustration showing a sloped line of FIG. 6 read by an image sensor.

DETAILED DESCRIPTION OF THE INVENTION

The present invention will be apparent from the following detailed description, which proceeds with reference to the accompanying drawings, wherein the same references relate to the same elements.

The main spirit of the invention is to form a special mark on a separation reference sheet disposed opposite a scan region of a scanning module of an image reading apparatus. When a document is transported past the scan region, the special mark on the separation reference sheet is shielded by the document. When no document is located in the scan region, the special mark on the separation reference sheet is not shielded by the document. A separation line for separating pages of images is determined by finding the special mark in the image obtained by the scanning module, which scans multiple pages of documents.

Figure 1:
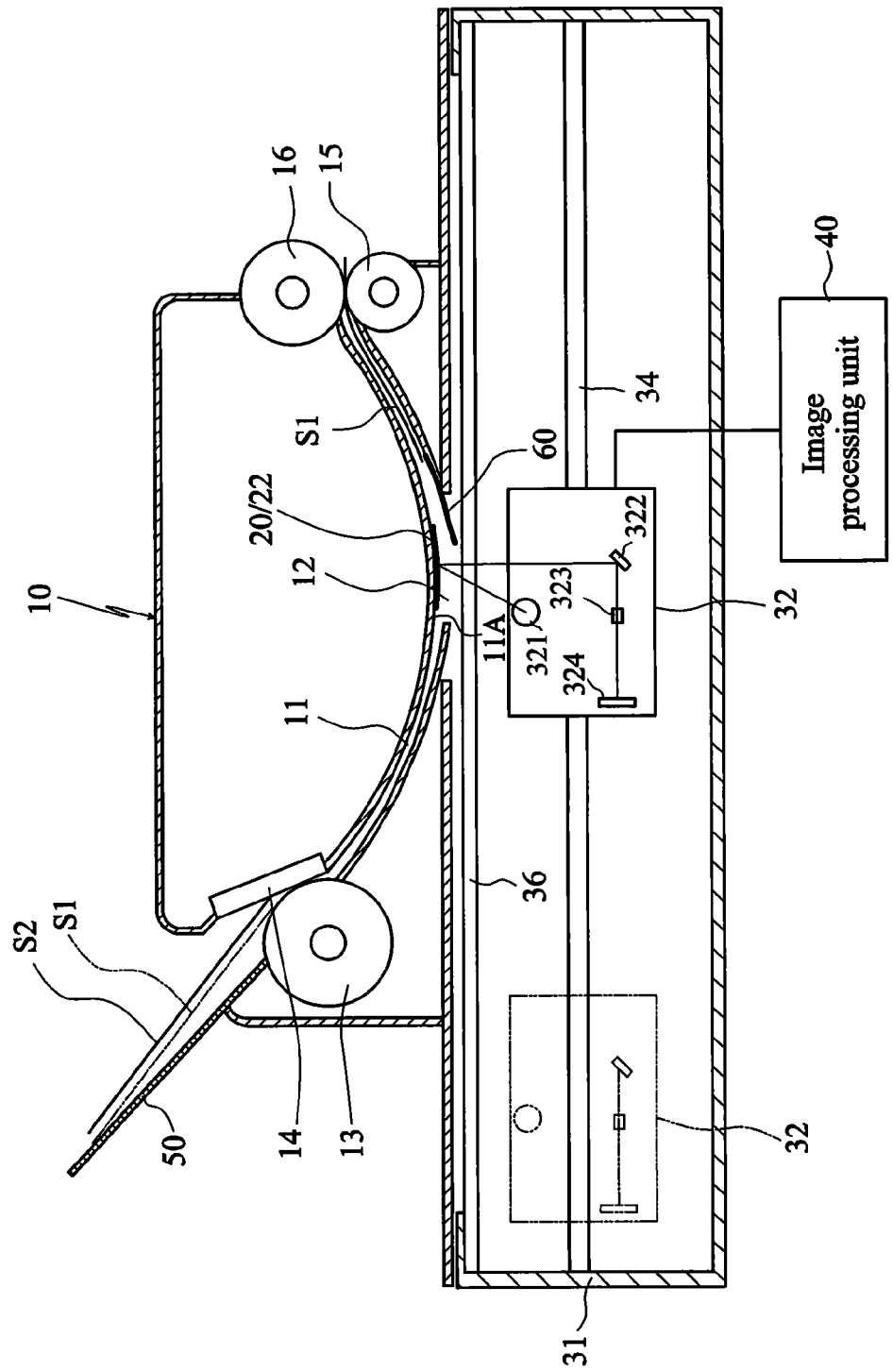
FIG. 1 is a schematic illustration showing an image reading apparatus capable of separating pages of images according to a preferred embodiment of the invention.
Figure 3:
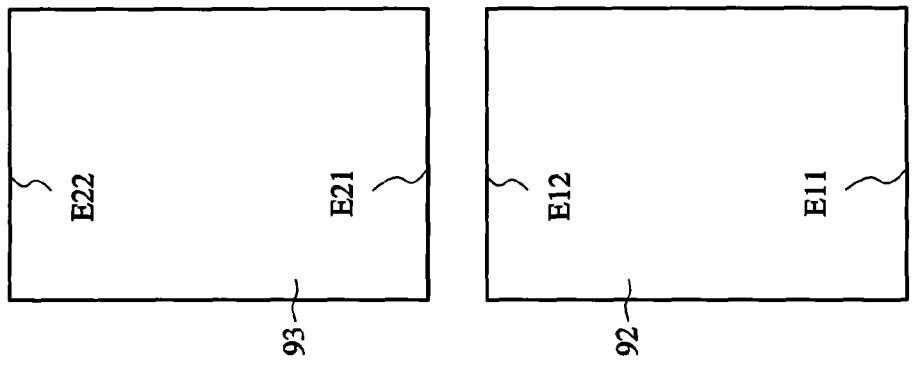
FIGS. 2 and 3 are schematic illustrations showing that a continuous image is divided.
Figure 2:
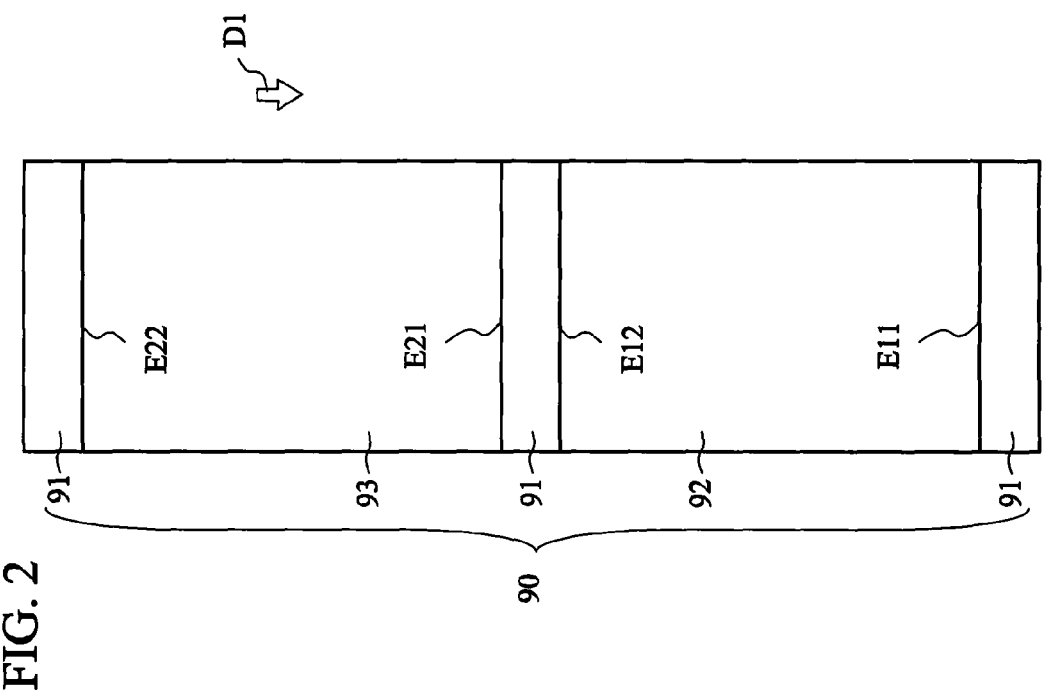

FIG. 1 is a schematic illustration showing an image reading apparatus capable of separating pages of images according to a preferred embodiment of the invention. FIGS. 2 and 3 are schematic illustrations showing that a continuous image is divided. Referring to FIGS. 1 to 3, the image reading apparatus of this embodiment includes a housing 31, an automatic sheet feeder 10, a separation reference sheet 20, a scanning module 32 and an image processing unit 40.

The automatic sheet feeder 10 may be an automatic document feeder (ADF) connected to the housing 31 and includes a document passageway 11. The document passageway 11 has an opening 12. The automatic sheet feeder 10 transports a first document S1 and a second document S2 along the document passageway 11 and past the opening 12. In this embodiment, a first roller 13 and a frictional element 14 of the automatic sheet feeder 10 cooperate with each other to separate the first document S1 from the second document S2. A second roller 15 and a driven roller 16 cooperate with each other to sequentially transport the first document S1 and the second document S2 out of the automatic sheet feeder 10.

The separation reference sheet 20 is disposed in the opening 12 and opposite the scanning module 32. The separation reference sheet 20 includes a specific portion 22, which is the portion corresponding to the position of the scan line of the scanning module 32. In this embodiment, the separation reference sheet 20 is disposed on a wall surface 11A of the document passageway 11.

The scanning module 32, which is disposed in the housing 31 and located at a position opposite the opening 12 and the separation reference sheet 20, scans the specific portion 22 of the separation reference 20 and the first document S1 and the second document S2 transported past the opening 12 to generate a continuous image 90. The housing 31 has a platen 36, which is disposed opposite the opening 12 of the automatic sheet feeder 10 and supports the first document S1 and the second document S2 transported along the document passageway 11. When the first document S1 and the second document S2 are transported past the opening 12, the scanning module 32 scans the specific portion 22 of the separation reference 20 and the first and second documents to generate the continuous image 90. In this embodiment, the scanning module 32 is a charge coupled device (CCD) scanning module including a light source 321, a reflecting mirror 322, a lens 323 and an image sensor 324. However, the scanning module 32 is not limited to the charge coupled device (CCD) scanning module, and may be a contact image sensor (CIS) scanning module in another embodiment.

In this embodiment, the scanning module 32 may be moved relatively to the opening 12 along a guiding rod 34 disposed in the housing 31. However, the invention is not limited thereto. In another embodiment, the scanning module 32 may be configured to be stationary relatively to the opening 12.

In this embodiment, as shown in FIG. 2, the continuous image 90 includes a first document image 92, a second document image 93 and three specific images 91. The first document image 92 is generated after the scanning module 32 scans the first document S1, and corresponds to the first document S1. The second document image 93 is generated after the scanning module 32 scans the second document S2, and corresponds to the second document S2. Each specific image 91 is composed of one specific portion 22 or multiple specific portions 22, and the specific images 91 are respectively connected to a leading edge E11 of the first document image 92, connected to and between a trailing edge E12 of the first document image 92 and a leading edge E21 of the second document image 93, and connected to a trailing edge E22 of the second document image 93. However, the invention is not limited thereto. The continuous image 90 may only contain the first document image 92, the second document image 93 and the specific image 91, which is interposed between the first document image 92 and the second document image 93 and includes the specific portion 22. The specific image 91 is connected to the trailing edge E12 of the first document image 92 and the leading edge E21 of the second document image 93. The image processing unit 40 only has to remove the specific image 91 of the continuous image 90 so that the pages of images may be separated.

The image processing unit 40 may be disposed inside or outside the image reading apparatus. The image processing unit 40 may be, for example, coupled to a processor of the scanning module 32, or an application program in a personal computer. The image processing unit 40 coupled to the scanning module 32 receives the continuous image 90, and removes the specific image 91 from the continuous image 90 so that the continuous image 90 is processed into the first document image 92 corresponding to the first document S1 and the second document image 93 of the second document S2, as shown in FIG. 3, and the pages of images may be separated.

It is to be noted that the specific portion 22 on the separation reference sheet 20 corresponds to the position wherein the light source 321 illuminates a scan line of the separation reference sheet 20. In this embodiment, if the specific image 91 generated after the image processing unit 40 scans the specific portion 22 of the separation reference sheet 20 cannot correspond to an expectative scan result in the image processing unit 40, the image processing unit 40 does not separate the continuous image 90; and if the specific image 91 generated after the specific portion 22 is scanned can correspond to the expectative scan result in the image processing unit 40, the continuous image 90 has to be separated. The image reading apparatus of this embodiment may further include a tray 50 and a guiding element 60. The tray 50 is mounted on the automatic sheet feeder 10 and connected to the document passageway 11. The tray 50 supports the first document S1 and the second document S2. The guiding element 60 is disposed in the opening 12 and guides the first document S1 and the second document S2 out of the opening 12 along the document passageway 11.

In addition to the function of separating the images, the scanning module 32 may further scan the separation reference sheet 20 to calibrate the luminance of the light source 321 of the scanning module 32 according to the separation reference sheet 20. For example, the separation reference sheet 20 may have a sector corresponding to the standard white with the gray level of 255. After the image reading apparatus boots up, the scanning module 32 scans the sector to judge the difference between its gray level and 255. For example, if the scanned gray level is 240, then the image reading apparatus or the image processing software may obtain a compensation function of compensating the gray level of 240 into the gray level of 255, and then compensate the gray level of the image subsequently scanned by the scanning module 32 according to the compensation function.

Figure 6:
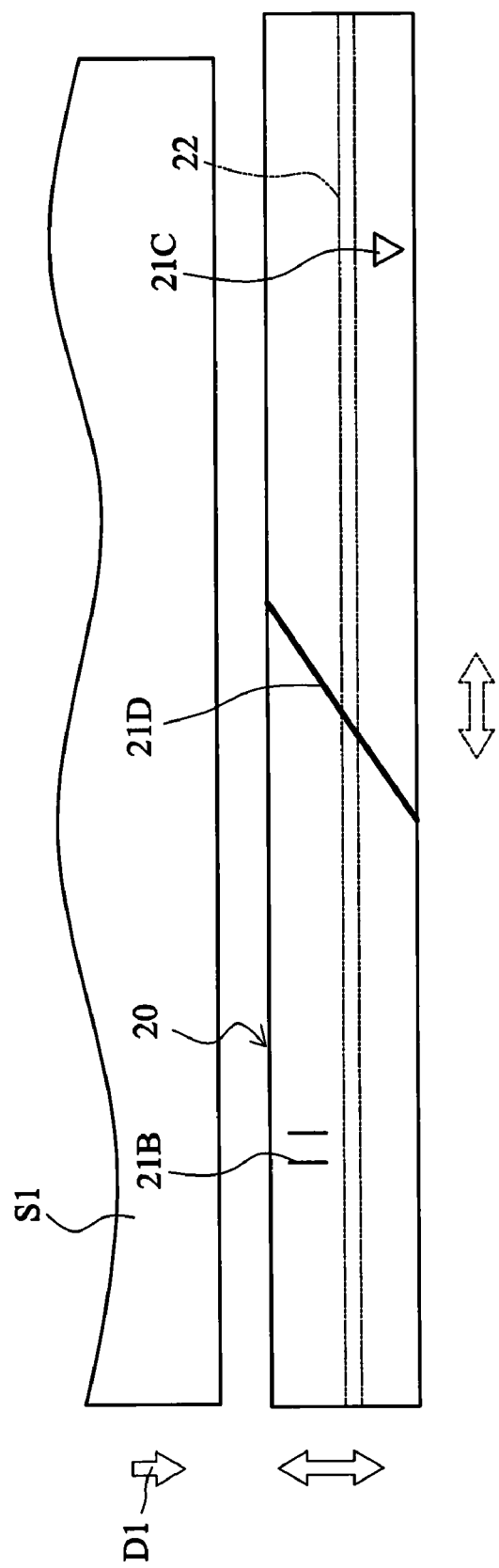

FIGS. 4 to 6 are schematic illustrations showing separation reference sheets according to several embodiments of the invention. As shown in FIG. 4, the separation reference sheet 20 is moveable so that different reference patterns may be switched according to different originals. Thus, different portions of the separation reference sheet 20 may be scanned by the scanning module 32 to prevent the condition that the pattern of the first document S1 or the second document S2 is the same as or similar to the pattern of the specific image 91 after the separation reference sheet is scanned, and thus to prevent the incorrect separation of pages of images. The separation reference sheet 20 is moveable in a direction, which may be parallel or perpendicular to a sheet feeding direction D1 of the first document S1. Alternatively, the separation reference sheet 20 is moveable in a direction, which is not perpendicular and parallel to the sheet feeding direction D1 of the first document S1.

In the embodiment of FIG. 4, the separation reference sheet 20 includes three straight line patterns 21A parallel to the sheet feeding direction D1 of the first document S1, and may further include a straight line pattern 21B and a geometrical pattern 21C. In the embodiment, the geometrical pattern 21C is a triangle. When the expectative scan result obtained after the specific portion 22 of the separation reference sheet 20 is scanned is similar to the pattern of the to-be-scanned document, the separation reference sheet 20 may be moved so that the straight line pattern 21B or the geometrical pattern 21C enters the specific portion 22 of the separation reference sheet 20, the scanned pattern of the specific image 91 is changed, and the pages of images may be correctly separated. For example, when the separation reference sheet 20 is moved such that the specific portion 22 of FIG. 5 is scanned, the scanned specific image has five lines because five intersections exist between the specific portion 22 of the separation reference sheet 20 and the straight line patterns 21A and 21B. Because the straight line pattern 21A may be a monochrome or a color straight line and the scanning module 32 can perform the monochrome or color scan, the specific image 91 may be a monochrome image or a color image.

Referring to another embodiment in FIG. 6, the separation reference sheet 20 includes a sloped line 21D, and an included angle between the sloped line and the sheet feeding direction D1 of the first document S1 is smaller than 90 degrees. For example, the included angle may be 30, 45 or 60 degrees. In addition, the separation reference sheet 20 may further include a straight line pattern 21B and a triangular pattern 21C. Because the sloped line 21D may be a monochrome or color straight line and the scanning module 32 may perform the monochrome or color scan, the specific image 91 may be a monochrome image or a color image.

FIG. 7 is a schematic illustration showing the sloped line of FIG. 6 read by an image sensor. As shown in FIG. 7, an image sensor 324 has three rows of red, green and blue sensing units 324R, 324G and 324B. If the sloped line 21D is a monochrome sloped line, then the color levels sensed by the image sensor 324 at the position x1 are (R, G, B)=(255, 255, 0); the color levels sensed by the image sensor 324 at the position x2 are (R, G, B)=(255, 0, 255); and the color levels sensed by the image sensor 324 at the position x3 are (R, G, B)=(0, 255, 255). Therefore, the sensed colors are respectively cyan, magenta and yellow at the positions x1, x2 and x3. The scanned pattern of the specific image 91 obtained by scanning the sloped line 21D will be three straight lines whose colors corresponding to the positions x1, x2 and x3 respective are cyan, magenta and yellow. The pages of images may be separated according to the sensed data.

According to the embodiments of the invention, the paper sensor may be completely removed so that the cost may be lowered and the pages of images may be precisely separated. As for the gap for separation, it is found that the conventional mechanical sensing apparatus cannot handle the condition with the separation gap smaller than 1 millimeter, while the invention can handle the condition with the separation gap equal to or smaller than 1 millimeter.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An image reading apparatus capable of separating pages of images, the image reading apparatus comprising:
   a housing;
   an automatic sheet feeder connected to the housing, the automatic sheet feeder comprising a document passageway, the document passageway having an opening, the automatic sheet feeder being for transporting a first document and a second document along the document passageway and past the opening;
   a separation reference sheet disposed in the opening, the separation reference sheet comprising a specific portion;
   a scanning module, disposed in the housing and disposed at a position opposite the separation reference sheet, for scanning the specific portion of the separation reference and the first document and the second document transported past the opening and generating a continuous image; and
   an image processing unit, coupled to the scanning module, for receiving the continuous image and processing the continuous image into a first document image corresponding to the first document and a second document image corresponding to the second document according to a specific image comprising the specific portion, wherein in the continuous image the specific image is interposed between the first document image and the second document image.

2. The image reading apparatus according to claim 1, wherein the separation reference sheet is disposed on a wall surface of the document passageway.

3. The image reading apparatus according to claim 1, wherein the separation reference sheet is moveable.

4. The image reading apparatus according to claim 3, wherein the separation reference sheet is moveable in a direction parallel to a sheet feeding direction of the first document.

5. The image reading apparatus according to claim 3, wherein the separation reference sheet is moveable in a direction perpendicular to a sheet feeding direction of the first document.

6. The image reading apparatus according to claim 3, wherein the separation reference sheet has different portions that may be scanned by the scanning module.

7. The image reading apparatus according to claim 1, wherein the separation reference sheet comprises a straight line parallel to a sheet feeding direction of the first document.

8. The image reading apparatus according to claim 7, wherein the specific image is a monochrome image.

9. The image reading apparatus according to claim 7, wherein the specific image is a color image.

10. The image reading apparatus according to claim 1, wherein the separation reference sheet comprises a sloped line, and an included angle between the sloped line and a sheet feeding direction of the first document is smaller than 90 degrees.

11. The image reading apparatus according to claim 10, wherein the specific image is a monochrome image.

12. The image reading apparatus according to claim 10, wherein the specific image is a color image.

13. The image reading apparatus according to claim 1, further comprising a tray, mounted on the automatic sheet feeder and connected to the document passageway, for supporting the first document and the second document.

14. The image reading apparatus according to claim 1, further comprising:
   a guiding element, disposed in the opening, for guiding the first document and the second document away from the opening.

15. The image reading apparatus according to claim 1, wherein the scanning module may be moved relatively to the opening.

16. The image reading apparatus according to claim 1, wherein the scanning module is stationary relatively to the opening.

17. The image reading apparatus according to claim 1, wherein the scanning module further scans the separation reference sheet to calibrate luminance of a light source of the scanning module according to the separation reference sheet.

18. The image reading apparatus according to claim 1, wherein the automatic sheet feeder is an automatic document feeder.

19. The image reading apparatus according to claim 1, wherein the separation reference sheet further comprises a geometrical pattern.

* * * * *